United States Patent [19]
Graham et al.

[11] Patent Number: 5,937,641
[45] Date of Patent: Aug. 17, 1999

[54] CATALYTIC CONVERTER FOR EXHAUST GASES HAVING A HIGH SURFACE AREA CATALYTIC CORE ELEMENT

[76] Inventors: Donald W. Graham, 2448 Westwood Northern Blvd., Cincinnati, Ohio 45211; Samual R. Hollingsworth, Jr., 2035 Calvin Cliff La., Cincinnati, Ohio 45206; Robert D. Burns, 1226 Cincinnati Batavia Pike, Batavia, Ohio 45103; Michael D. Mitchell, 10382 Pippin Rd., Cincinnati, Ohio 45213; Sokhorn Eam, 2825 Grosvenor Dr., Cincinnati, Ohio 45206

[21] Appl. No.: 08/755,281

[22] Filed: Nov. 22, 1996

[51] Int. Cl.$^6$ ............................... F01N 3/28; F01N 7/10
[52] U.S. Cl. ................................. 60/302; 60/323
[58] Field of Search .............................. 60/274, 302, 323

[56] References Cited

U.S. PATENT DOCUMENTS

| | | | |
|---|---|---|---|
| 3,867,313 | 2/1975 | Brewer | 502/314 |
| 4,027,476 | 6/1977 | Schmidt | 60/218 |
| 5,427,601 | 6/1995 | Harada et al. | 75/235 |
| 5,692,373 | 12/1997 | Atmur et al. | 60/323 X |

FOREIGN PATENT DOCUMENTS

| | | | |
|---|---|---|---|
| 4-27707 | 1/1992 | Japan | 60/302 |

OTHER PUBLICATIONS

*Catalysts Based On Foam Metals*, by A.N. Pestryakov, A.N. Devochkin & A.A. Fedorov, Journal of Advanced Materials 1974, pp. 471–476.

*Primary Examiner*—Tony M. Argenbright
*Attorney, Agent, or Firm*—Mark F. Smith; Smith, Knochelmann, Freese & Guttag

[57] ABSTRACT

A catalytic converter having a catalytic core element comprising a rigid, foam-like, metallic material having interconnecting walls defining an open pattern of interconnected pores which join together to form irregular passages extending through the catalytic core element. The catalytic core element may be configured for placement within the exhaust manifold or exhaust pipe of an internal combustion engine or within a separate housing. The catalytic core element may be configured such that exhaust flow through the catalytic core element may be radial through the lateral portion of the catalytic core element and axial through the end of the catalytic core element.

6 Claims, 12 Drawing Sheets

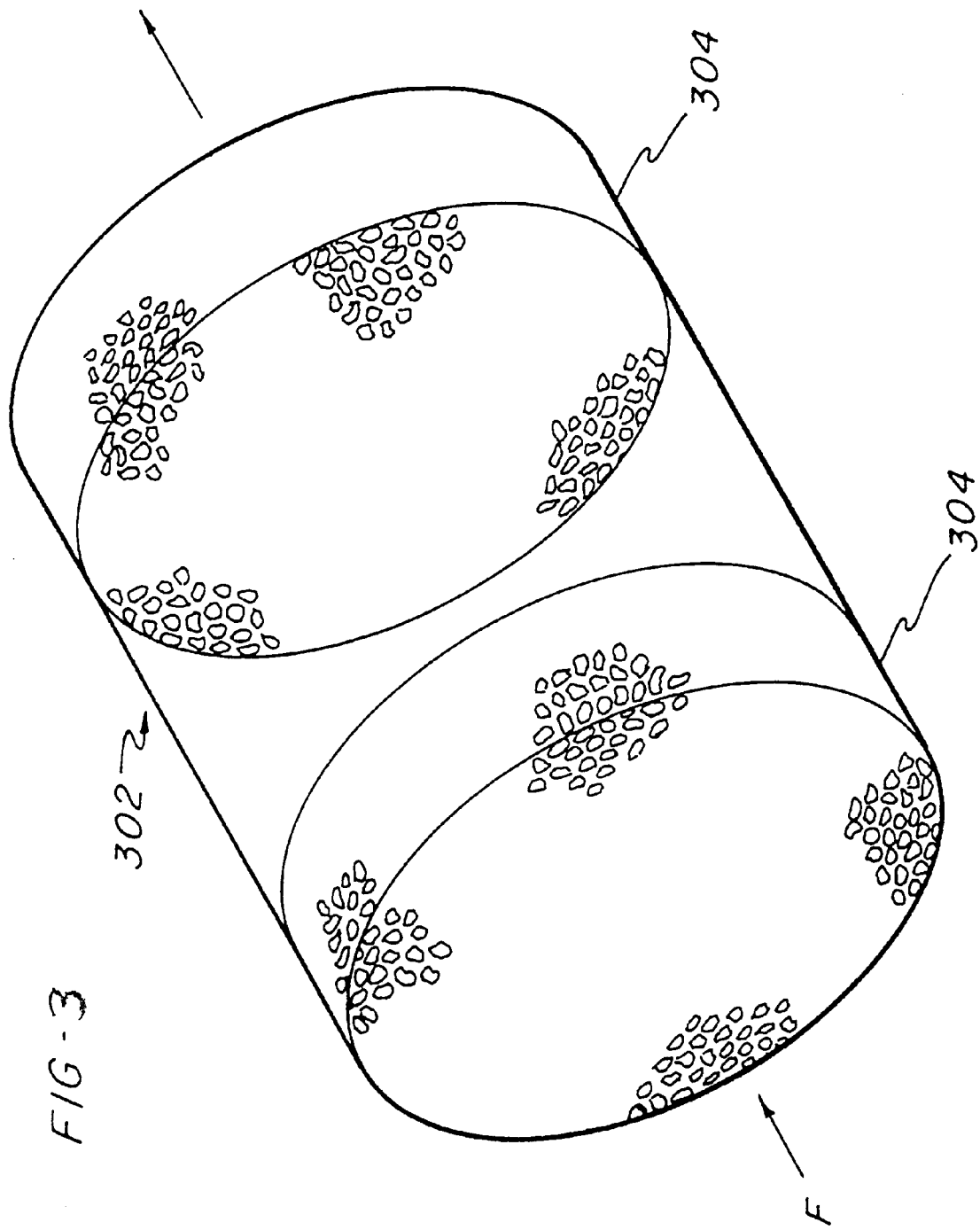

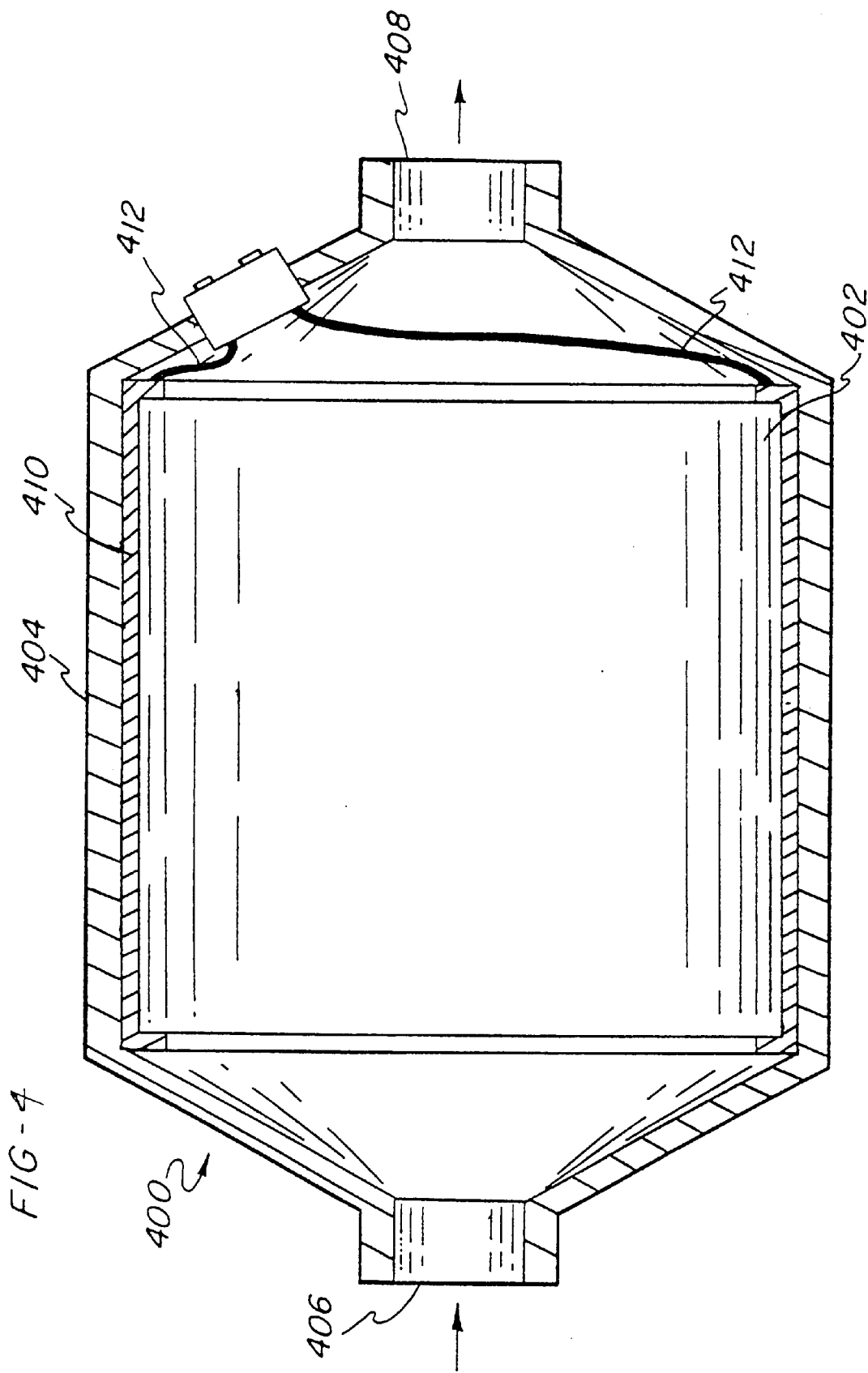

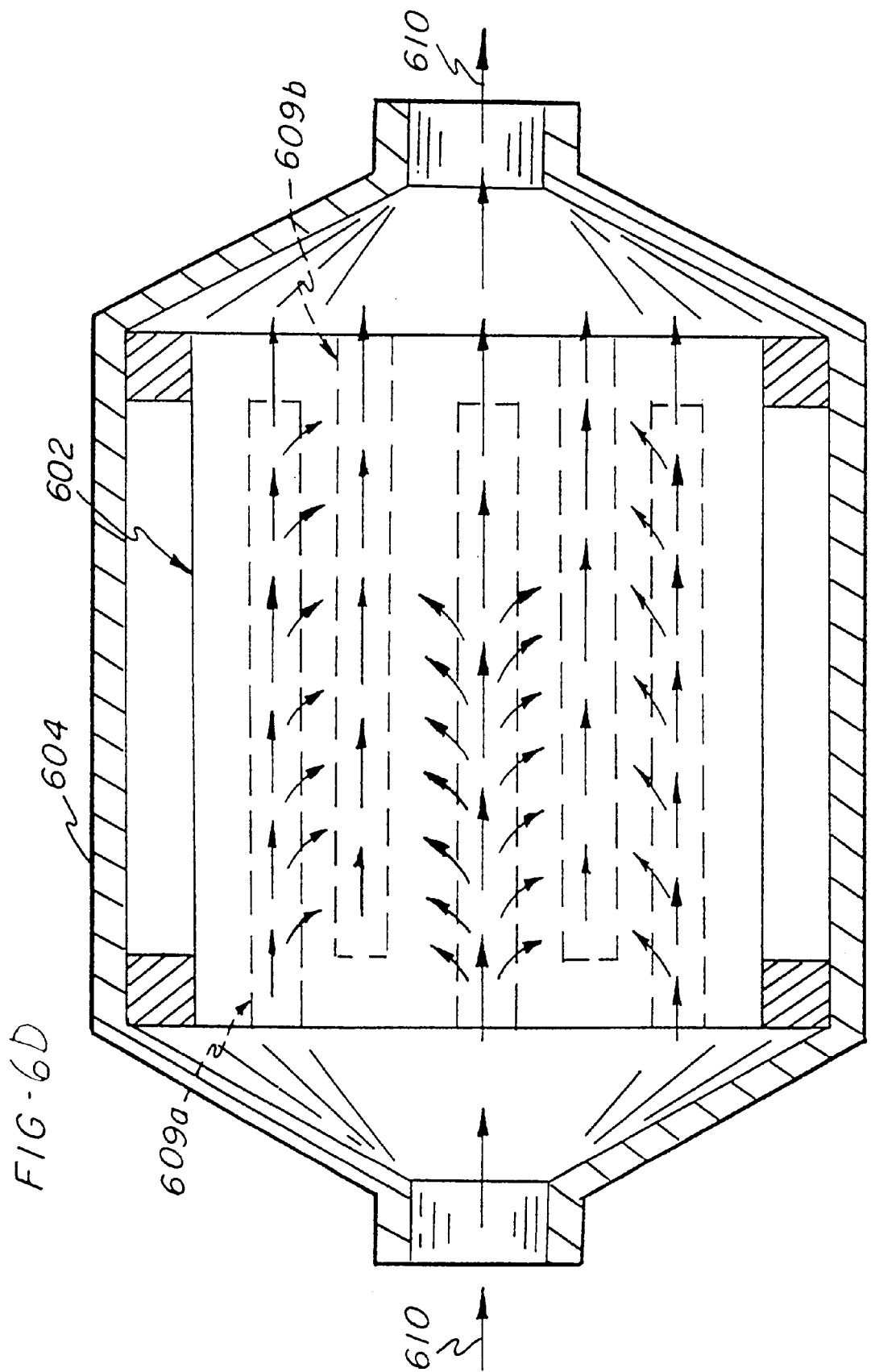

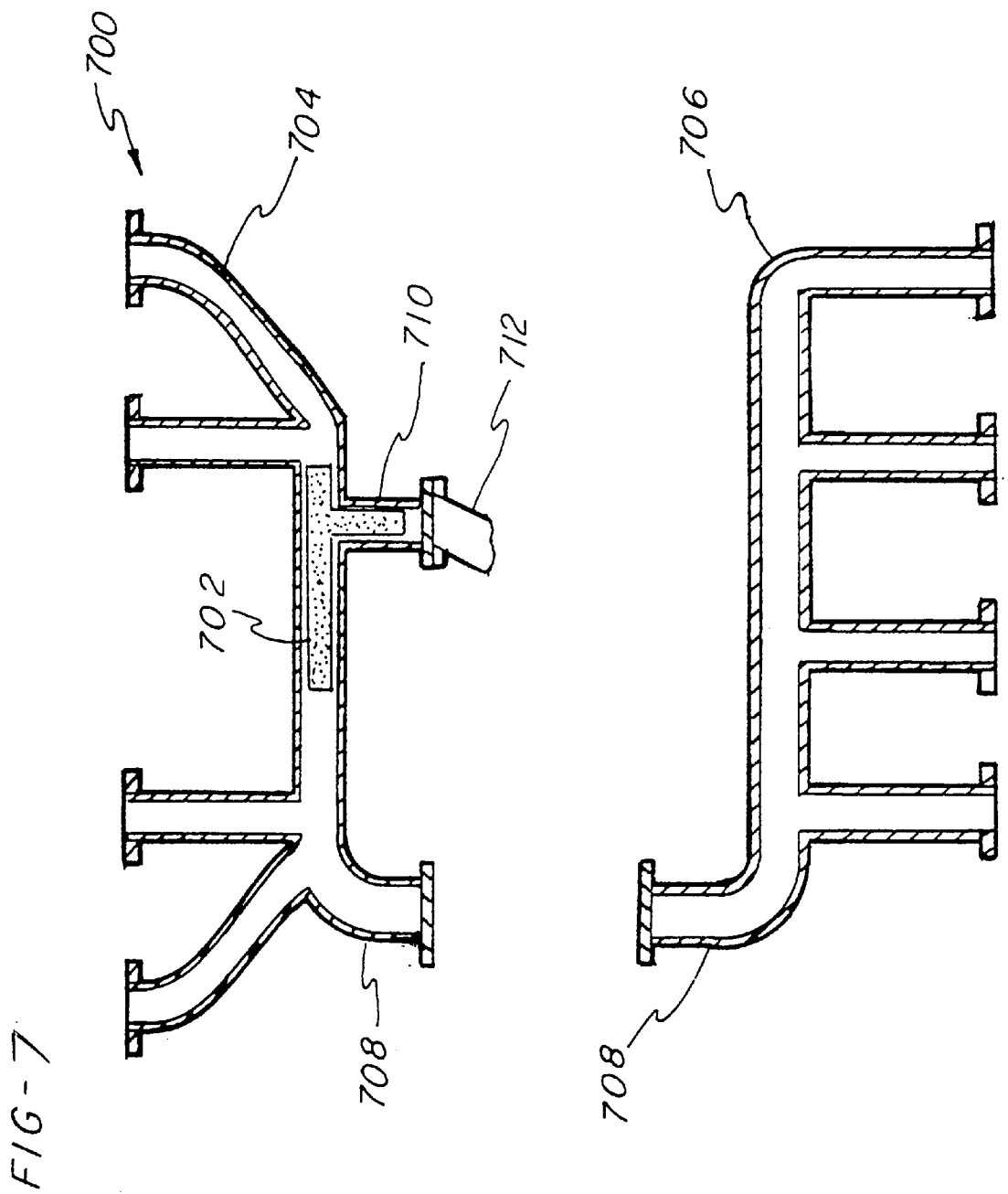

CATALYTIC CONVERTER FOR EXHAUST GASES HAVING A HIGH SURFACE AREA CATALYTIC CORE ELEMENT

CROSS-REFERENCE TO RELATED APPLICATION

The present invention relates to a catalytic converter for exhaust gases and, more particularly, to an improvement in the catalytic converter for exhaust gases which is disclosed in the commonly owned and U.S. Pat. application Ser. No. 08/607,389, filed Feb. 25, 1996.

BACKGROUND OF THE INVENTION

Catalytic converters have been widely utilized with internal combustion engines, such as used in automobiles, to convert noxious exhaust gas components into harmless gases, with the intention being particularly directed to promoting the emission of carbon monoxide, hydrocarbons and oxides of nitrogen into carbon dioxide, water and nitrogen. The principal components of a typical catalytic converter are a housing having exhaust gas inlet and outlet ports and a catalytic core element enclosed within the housing. The catalytic core element of a conventional catalytic converter typically utilize a multichannel or honeycomb ceramic substrate having a catalyst deposited thereon; or catalyst coated refractory metal oxide beads or pellets; or a corrugated thin metal foil honeycomb monolith having a catalyst carried on or supported on its surface.

The catalyst typically used for catalytic converters is normally a noble metal, e.g., platinum, palladium, rhodium, ruthenium, or a mixture or combination of two or more of such metals. The catalyst catalyzes a chemical reaction, mainly oxidation, whereby the pollutant materials are converted to harmless by-products which then pass through the exhaust system into the atmosphere.

One problem associated with catalytic converters having catalytic core elements utilizing multichannel or honeycomb ceramic substrates is the rigid nature of the ceramic substrates which make them prone to cracking when subjected to thermal stresses and vibrations, such as, for example, those encountered when used in catalytic converters for automobiles or other vehicles. In order to reduce the risk of fracture, the ceramic substrates are often surrounded with a flexible material shrouding. The use of such shrouding, however, substantially increases the difficulty and cost of manufacture. Further, in many applications, such as for use in catalytic converters for use in automobiles and small appliances and equipment, severe space limitations are often encountered which restrict the size and shape of the catalytic converter. Unfortunately, however, the cross-sectional shapes of the ceramic multichannel or honeycomb substrates, which can be economically manufactured for use as catalytic converter core elements, are round or oval in configuration. Thus, the use of such substrates is often undesirable. Another problem associated with such catalytic converters having catalytic core elements utilizing multichannel or honeycomb ceramic substrates is the time consuming and relatively expensive production methods necessary to install such fragile catalytic core elements in the catalytic converter housing.

One problem associated with catalytic converters having catalytic core elements which utilize catalyst coated refractory metal oxide beads or pellets is bead or pellet fluidization. A catalytic converter must survive the turbulent hot exhaust stream and complete the combustion of the gases. During operation, the hot exhaust flow can agitate, swirl and grind the beads or pellets until the function of the converter significantly deteriorates. Accordingly, catalytic converters having such catalytic core elements utilizing catalyst coated refractory metal oxide beads or pellets often require repair or replacement which significantly increases the cost of their use.

One problem associated with catalytic converters having catalytic core elements utilizing a corrugated thin metal foil honeycomb monoliths having a catalyst carried on or supported on their surface is the relatively expensive manufacturing cost of the monoliths. In addition, the leading edge of the monoliths must be reinforced to prevent flutter due to the impingement of the turbulent hot exhaust gases and to prevent crushing or collapse of the monoliths. Such reinforcement significantly increases the manufacturing costs of the catalytic converters and significantly reduces manufacturing speed.

A continuing concern in the catalytic converter industry, particularly in the automotive field, is the fact that excessive flow resistance or pressure loss reduces engine efficiency and performance. Thus, reducing pressure loss while maintaining effective emission control is a continuing industry goal. The term "pressure drop" as used herein means the difference between the pressure at the inlet face and the outlet face of the catalytic core element. The pressure drop across a catalytic core element of a catalytic converter generally used in the automotive industry is typically 2 inches of water at idle, and 12 to 15 inches of water at higher speeds. Higher pressure drops are undesirable, because the engine must expend extra energy to force the exhaust gas through the converter core element thereby reducing engine efficiency.

Accordingly, a need exists for a catalytic converter which is capable of withstanding the thermal stresses and vibrations encountered in typical catalytic converter installations and applications, is relatively easy and inexpensive to manufacture, has relatively long operating life, has a relatively low pressure drop, requires the same or less space than conventional catalytic converters, and can be manufactured having various cross-section configurations.

SUMMARY OF THE INVENTION

The present invention is directed to a catalytic converter for converting a flow of exhaust gases into harmless gasses comprising a high surface area catalytic core element formed from at least one rigid, reticulated or foam-like, metallic material.

In one embodiment of the present invention, the catalytic core element includes at least one longitudinally extending aperture therein for receiving the exhaust gases.

In another embodiment of the present invention, the catalytic core element includes a plurality of staggered, longitudinally extending apertures to reduce flow resistance.

In another preferred embodiment of the invention, the catalytic core element comprises a plurality of rigid, foam-like, metallic material segments arranged one after the other with their density decreasing in the direction of flow of the exhaust gases in order to reduce flow resistance.

In another preferred embodiment of the invention, the catalytic core element is mounted directly within the exhaust manifold of an internal combustion engine.

In another preferred embodiment of the invention, the catalytic core element is mounted directly within the exhaust pipe of an internal combustion engine.

In another preferred embodiment of the invention, the catalytic core element is mounted within a housing having an exhaust gas inlet and an exhaust outlet.

In another preferred embodiment of the invention, the catalytic core element is mounted within a housing of a noise reducing muffler assembly.

In another preferred embodiment of the invention the rigid, foam-like, metallic material is formed from an alloy comprising aluminum, chromium, and iron.

In another preferred embodiment of the invention, the rigid, foam-like, metallic material formed from an alloy comprising aluminum, chromium, cobalt, columbium, nickel iron, molybdenum, gold, silver, platinum, palladium, rhodium, rare earths, titanium, tantalum, tungsten, and their respective alloys.

In another preferred embodiment of the invention, the rigid, foam-like, metallic material may have a catalyst deposited thereon.

In another preferred embodiment of the invention, the catalytic core includes electrical conductors connected to the catalytic core element to form an electrical circuit such that a source of electrical potential may be connected across the electrical conductors whereby the catalytic core element may be electrically heated to a selected temperature.

A primary object of this invention, therefore, is to provide a catalytic converter for exhaust gases which is capable of withstanding the thermal stresses and vibrations encountered in typical catalytic converter installations and applications.

Another primary object of this invention is to provide a catalytic converter for exhaust gases which has a simple design and is relatively inexpensive to manufacture.

Another primary object of this invention is to provide a catalytic converter for exhaust gases which has relatively long operating life.

Another primary object of this invention is to provide a catalytic converter for exhaust gases which has a relatively low pressure drop.

Another primary object of this invention is to provide a catalytic converter for exhaust gases which requires the same or less space than conventional catalytic converters.

Another primary object of this invention is to provide a catalytic converter for exhaust gases which can be manufactured having various cross-sectional configurations.

Another primary object of this invention is to provide a catalytic converter for exhaust gases having a catalytic core element comprising a rigid, foam-like, material formed from an alloy comprising aluminum, chromium, and iron.

Another primary object of this invention is to provide a catalytic converter for exhaust gases having a catalytic core element formed from an alloy comprising aluminum, chromium, cobalt, columbium, iron, and further comprising at least one member selected from the group consisting of nickel, molybdenum, or precious metals including gold, silver, platinum, palladium, rhodium, rare earths, titanium, tantalum, tungsten, and their respective alloys.

Another primary object of this invention is to provide a catalytic converter for exhaust gases having a catalytic core element which may be heated to a selected temperature.

Another primary object of this invention is to provide a catalytic converter for exhaust gases having a catalytic core element which can be combined in a convenient package with a conventional muffler assembly.

These and other objects and advantages of the invention will be apparent from the following description, the accompanying drawings and the appended claims.

BRIEF DESCRIPTION OF THE DRAWINGS

FIG. 3 is a cross-sectional longitudinal view of the catalytic core element of the subject invention comprising more than one individual segment;

FIG. 4 is a cross-sectional longitudinal view of a catalytic converter in accordance with the present invention and showing electrical connectors connected to the catalytic core element;

FIG. 6D is a cross-section view of one configuration of a catalytic converter having the catalytic core element of FIG. 6B;

FIG. 7 is a cross-sectional longitudinal view of an exhaust manifold of a typical internal combustion engine showing another embodiment of the catalytic converter installed therein.

DETAILED DESCRIPTION OF THE PREFERRED EMBODIMENTS

Figure 1:
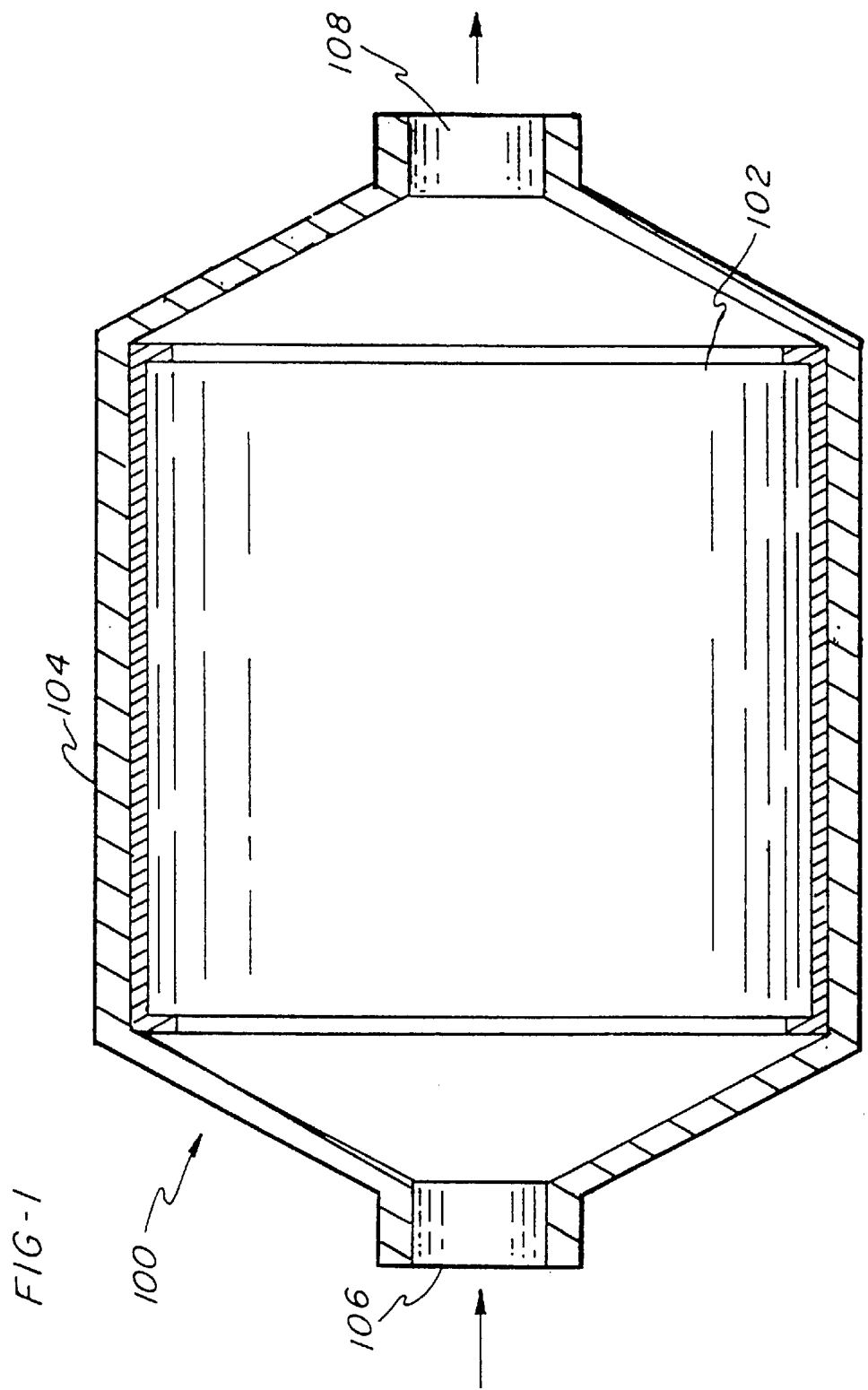
FIG. 1 is a cross-sectional longitudinal view of a conventional catalytic converter for use with an internal combustion engine, having a catalytic core element comprising a multichannel or honeycomb ceramic substrate.

Referring to FIG. 1, the principal components of a typical catalytic converter for use with an internal combustion engine, such as used in the automotive industry, are a catalytic core element 102 enclosed in a housing 104 having exhaust gas inlet 106 and outlet 108 ports. The catalytic core element 102 typically utilize a multichannel or honeycomb ceramic substrate (as shown) having a catalyst deposited thereon or a plurality of catalyst coated refractory metal oxide beads or pellets; or a corrugated thin metal foil honeycomb monolith having a catalyst carried on or supported on its surface.

The catalytic core element of the subject invention comprises at least one rigid, porous substrate or segment of reticulated or foam-like, high temperature, metallic material having relatively high mechanical strength and thermal shock resistance such as commercially available from Astro Met. Inc. of Cincinnati, Ohio.

Figure 2A:
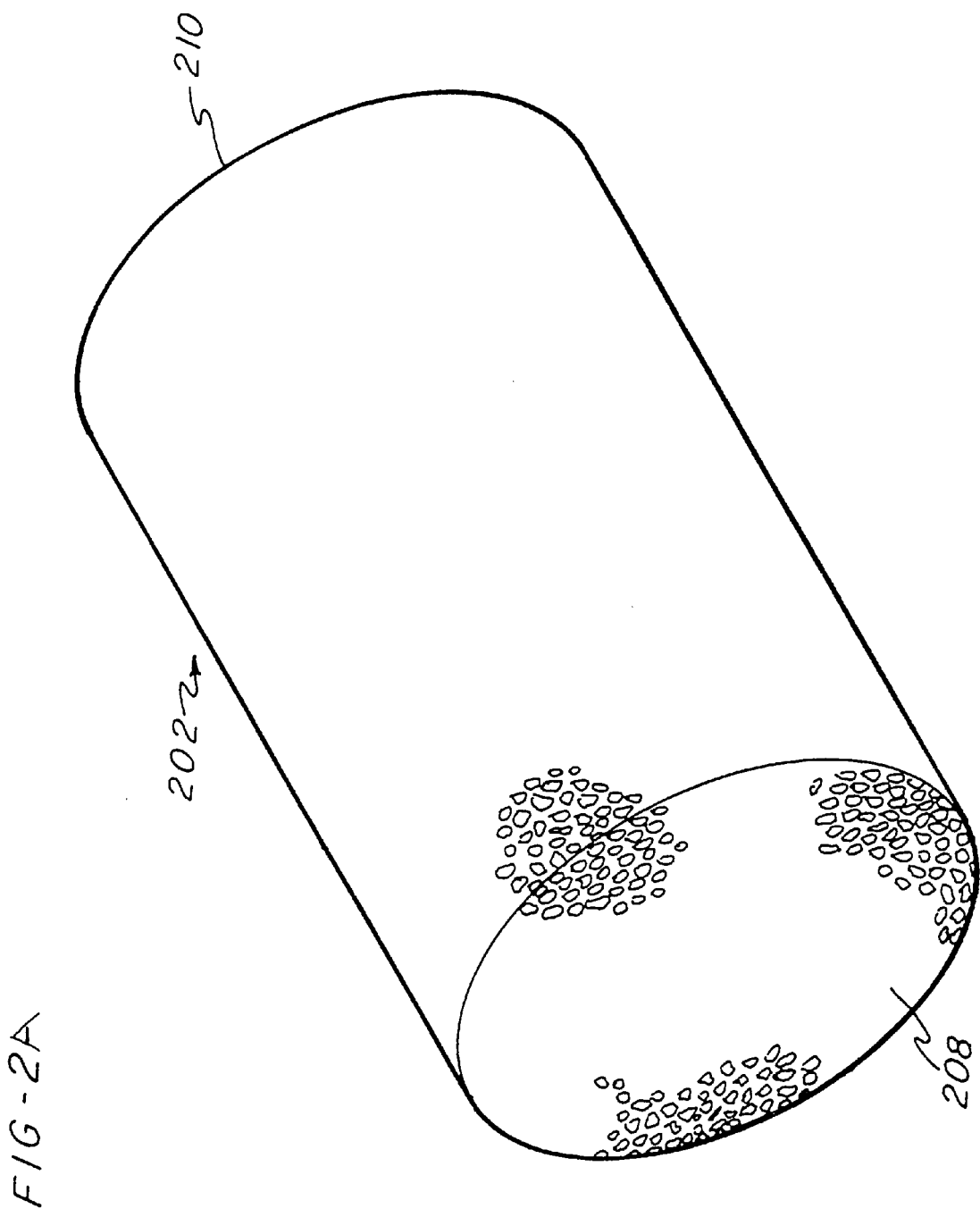
FIG. 2A is a pictorial view of a catalytic core element of the catalytic converter of the subject invention comprising a rigid, foam-like metallic segment.
Figure 2B:
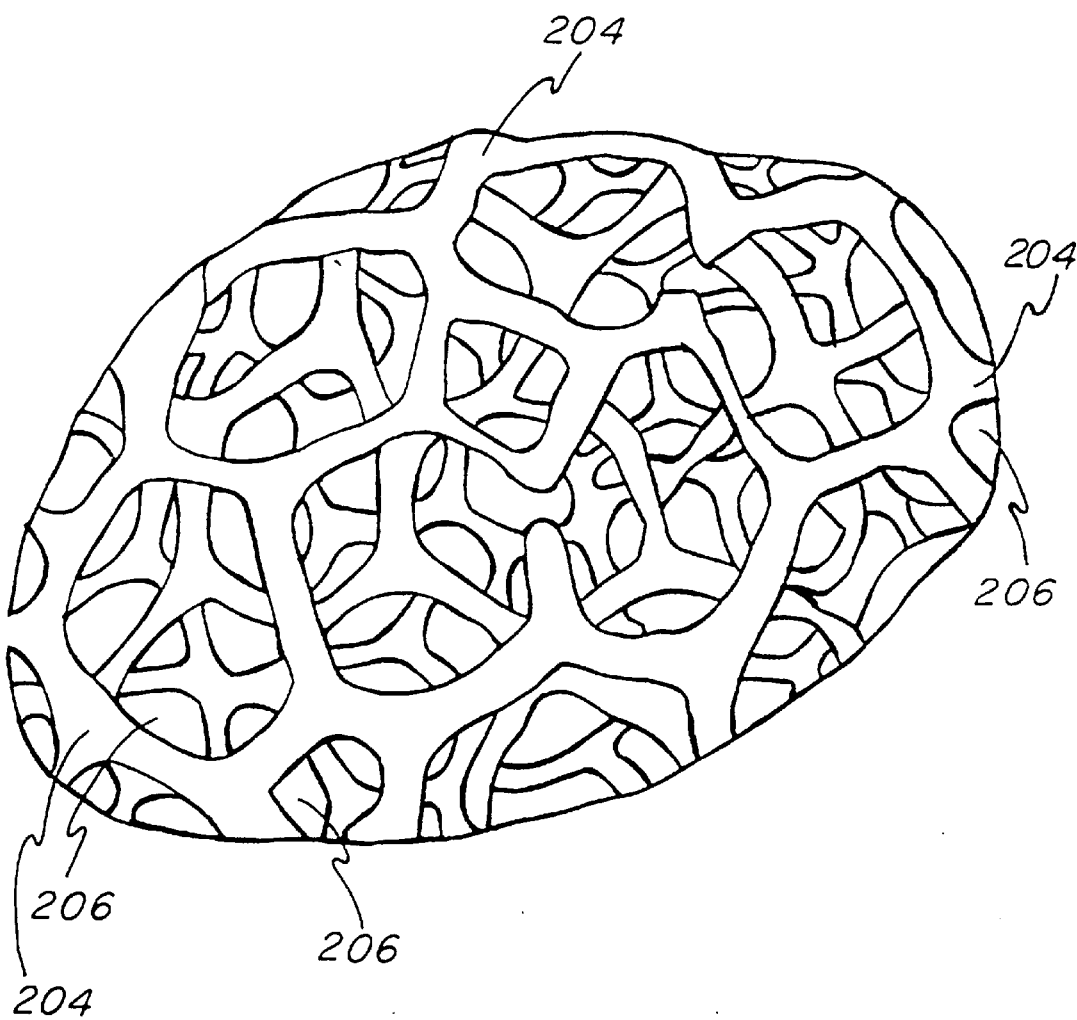
FIG. 2B is an enlarged view of a portion of the catalytic core elements of FIG. 2A showing, greatly enlarged, a representation of the rigid, foam-like, metallic material structure of the catalytic core element.

Referring to FIGS. 2A and 2B, rigid, porous substrate or segment of reticulated or foam-like, high temperature, metallic material forming the catalytic core element 202 of the subject invention is shown comprising interconnecting metallic walls 204 which define an open pattern of micronically sized interconnected pores 206 which join together to form irregular passages extending through the catalytic core element 202 from one end 208 to the other end 210. A continuing concern in the catalytic converter industry, particularly in the automotive field, is the fact that excessive flow resistance or pressure loss reduces engine efficiency and performance. Thus, reducing pressure loss while maintaining effective emission control is a continuing industry goal. Accordingly, the pores 206 are sufficiently large and numerous to trap exhaust particles while permitting the relatively free flow of exhaust gases through the porous catalytic core element 202 between the exhaust inlet port and the exhaust outlet port of the catalytic converter. Further, the numerous changes in direction of the gas as it flows through the catalytic core element 202 operates to evenly distribute particulates throughout the catalytic core element 202 thereby reducing the possibility of pressure drop buildup.

As is known in the industry, flow resistance or pressure drop increases over the length of the catalytic core element in the direction of flow. Referring to FIG. 3, in a preferred embodiment of the subject invention the catalytic core element 302 comprises at least two individual segments 304 arranged one after the other and contacting one another with their density decreasing sequentially in the direction of the gas flow F. In this way, the flow resistance or pressure drop across the catalytic core element may be controlled or further reduced. By the production process according to the present invention, such segments having differing density may be produced without difficulty.

In a preferred embodiment of the invention, the catalytic core element of the subject invention is provided with a platinum, palladium, rhodium or a combination thereof coating or may be formed of a material selected from the group consisting of platinum, palladium, rhodium and a combination thereof for imparting a catalytic action on the pollutant exhaust gases entering the catalytic converter such that the pollutant gases are converted to harmless by-products which then pass out through the catalytic converter to be discharged into the atmosphere. The catalytic core elements may also be formed from an alloy comprising aluminum, chromium, and iron. In addition, the alloy may further comprise other materials such as chromium, cobalt, columbium, nickel iron, molibdenum, or precious metals including gold, silver, rare earths, titanium, tantalum, tungsten, and their respective alloys and coated to form the catalytic core element to achieve the desired catalytic reactions.

By forming the rigid, foam-like catalytic core element of the subject invention from material such as platinum, palladium, rhodium or a combination thereof as disclosed hereinabove, eliminates or reduces the need for coating the element with a catalyst thereby permitting the catalytic converter of the subject invention to be manufactured with significantly less time and cost than conventional catalytic converters. It is known to a person skilled in the art that this catalytic action only proceeds in the desired manner if a particular stoichiometric composition of the exhaust gases exists. Non-illustrated devices for controlling the composition of the exhaust gasses which are not, however, the subject of the present invention are also assumed to be known.

Referring to FIG. 4, one embodiment of the catalytic converter 400 of the present invention is shown comprising a catalytic core element 402 enclosed within a housing 404 having an exhaust inlet 406 and an exhaust outlet 408. One problem associated with conventional catalytic converters is that the catalytic material will not be substantially activated when the temperature of the exhaust gases are too low. This typically occurs just after the start up of the engine. In accordance with a preferred embodiment of the invention, the catalytic core element 402 is electrically isolated from the housing 404 by insulation 410. Electrical conductors 412 are connected to the catalytic core element 402 to form an electrical circuit such that a source of electrical potential (not shown) may be connected across the electrical conductors 412. In operation, the rigid, foam-like metallic catalytic core element 402 serves as a resistance between the electrical conductors 412 and, when a source of electrical potential is applied, the catalytic core element heats rapidly to a selected temperature.

While the foregoing description describes a particular method of heating one or more catalytic core elements, it should be apparent to one skilled in the art that other conventional methods of heating one or more catalytic core elements, such as for example by inserting heating elements into the core, may be utilized.

Figure 5:
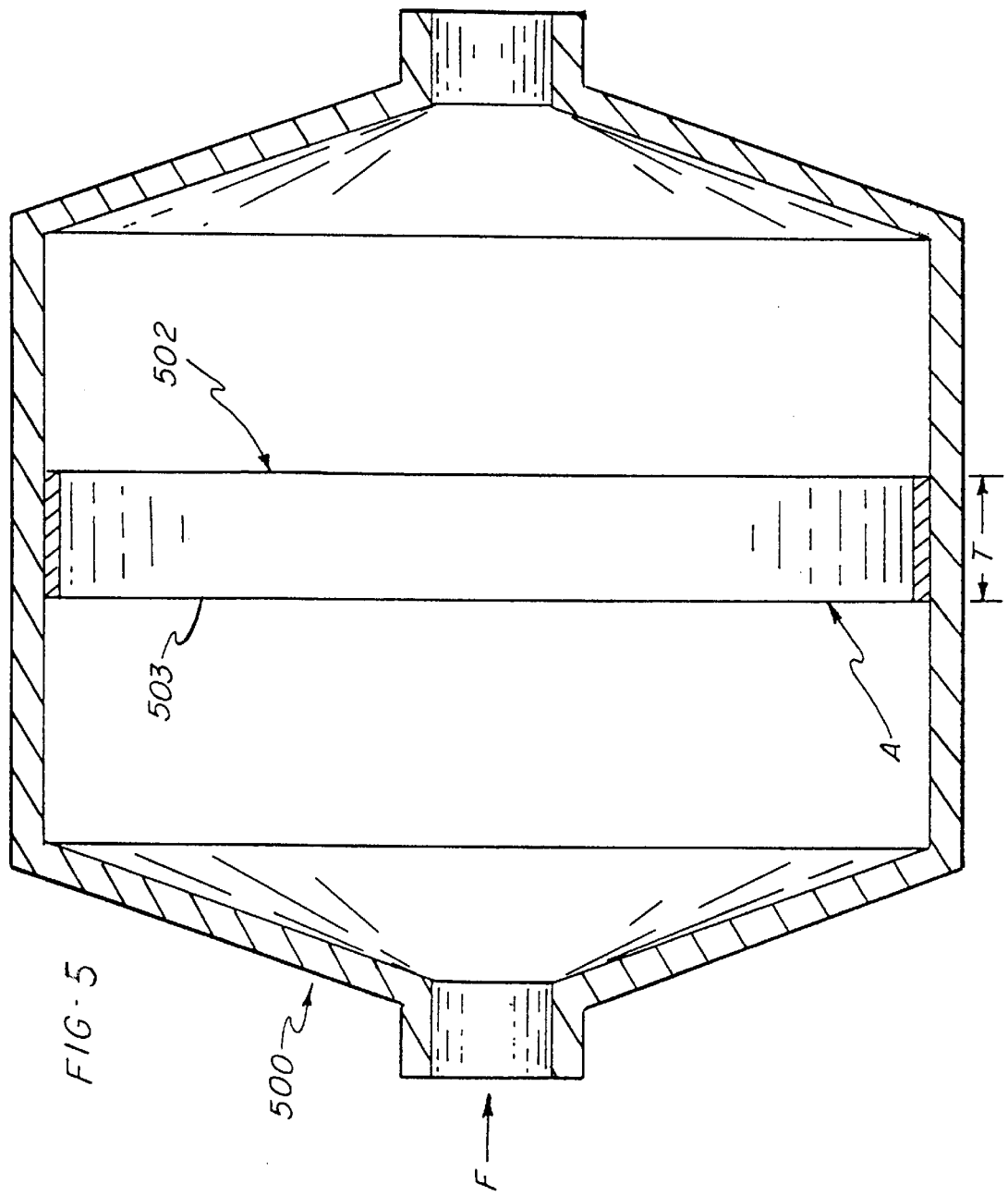
FIG. 5 is a cross-sectional longitudinal view of another embodiment of a catalytic converter in accordance with the present invention showing the catalytic core element of FIG. 4 having an enlarged inlet surface and a reduced thickness.

The flow resistance or pressure drop of the exhaust gas traveling through the catalytic core element depends on the velocity of the flow, the inlet surface area, the density and thickness or length of the catalytic core element. Referring to FIG. 5, another arrangement of the catalytic converter 500 of the subject invention is shown where the area A of the inlet surface 503 of the catalytic core element 502 is significantly enlarged and the thickness T of the catalytic core element 502 is significantly reduced. By increasing the inlet surface area A and reducing the thickness T or length of the catalytic core element 502 in the direction of the exhaust flow, the flow resistance or pressure drop may be controlled or reduced. Since the catalytic core element of the present invention is not susceptible to fracture, the particular dimensions of the catalytic core element may be varied to accommodate the desired purposes and may be produced without difficulty by the production process according to the present invention.

Figure 6A:
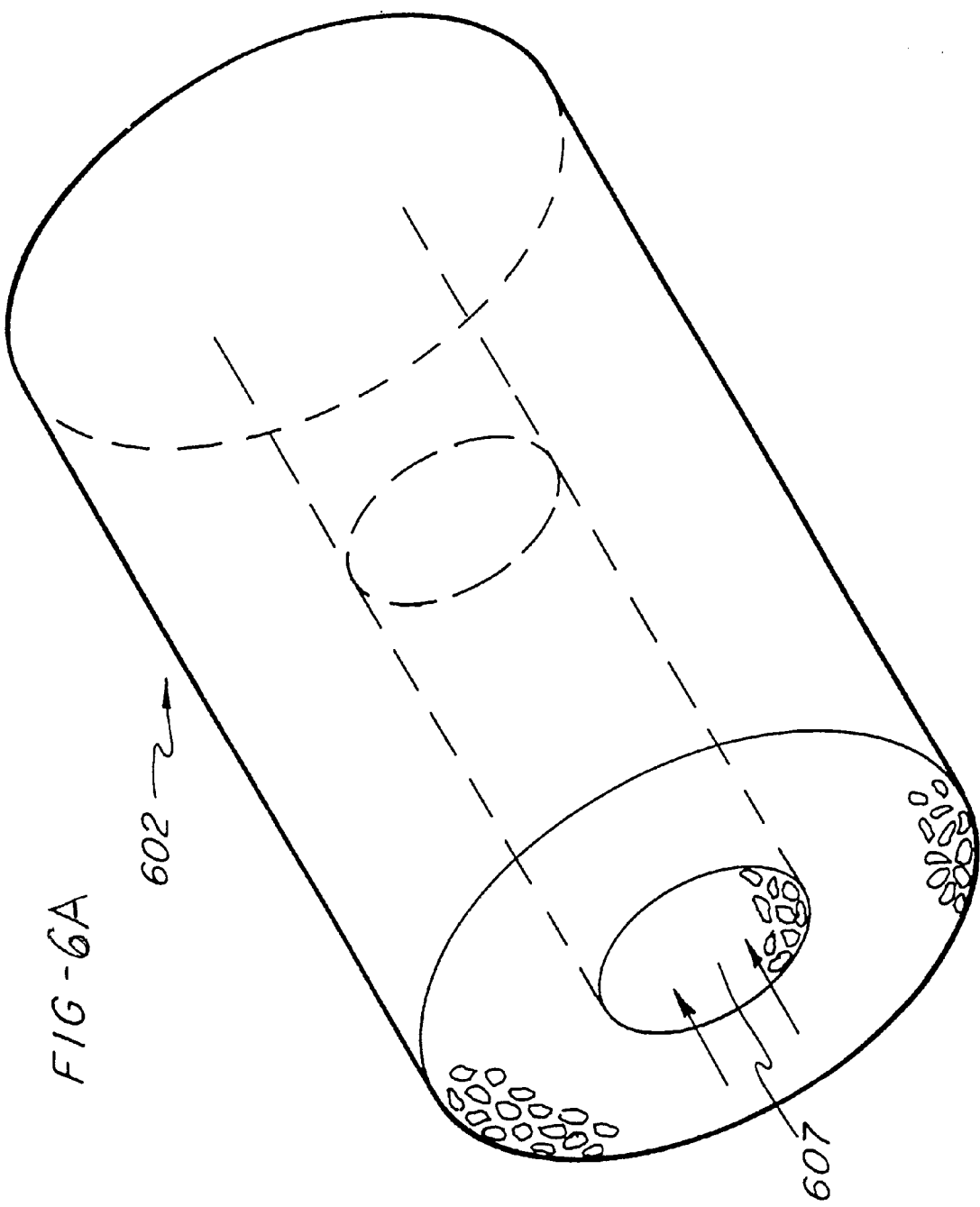
FIG. 6A is a pictorial view of the catalytic core element of FIG. 2A having a longitudinally extending central aperture.
Figure 6B:
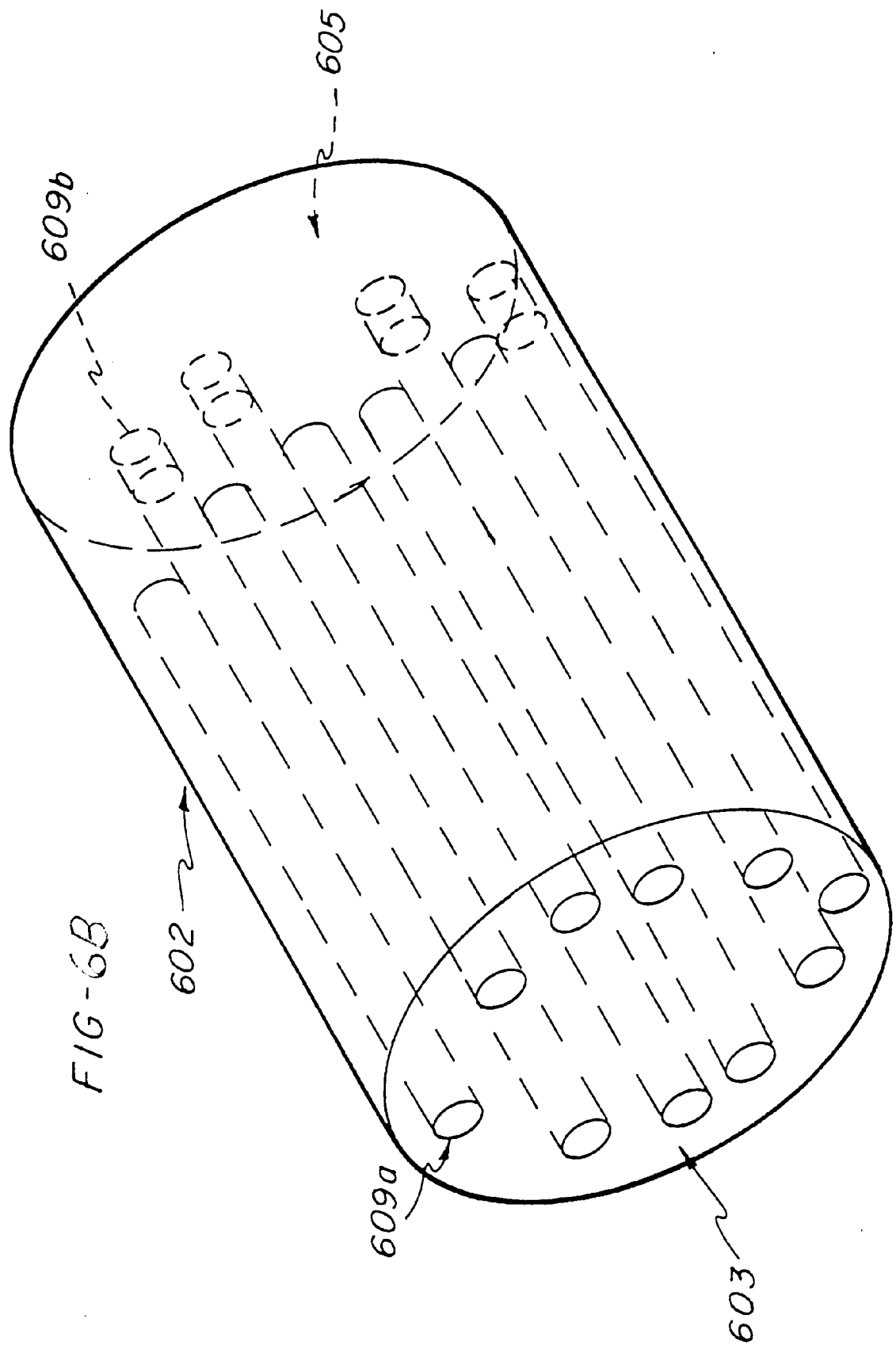
FIG. 6B is a pictorial view of the catalytic core element of FIG. 2A having a plurality of staggered longitudinally extending apertures.

Referring to FIGS. 6A and 6B, depending on the particular application, the flow resistance or pressure drop of the exhaust gas traveling through the catalytic core element may be reduced by providing the catalytic core element 602 with a longitudinally extending aperture 607 (FIG. 6A) or a plurality of staggered apertures (FIG. 6B) such that a number of apertures 609a extend longitudinally inwardly from the inlet surface 603 of the catalytic core element 602 and a number of apertures 609b extend longitudinally inwardly from the outlet surface 605 of the catalytic core element 602. Thus, the catalytic converter can be configured such that the flow through the catalytic core element 602 can be radial, through a lateral portion of the catalytic core element or axial through the end portion.

Figure 6C:
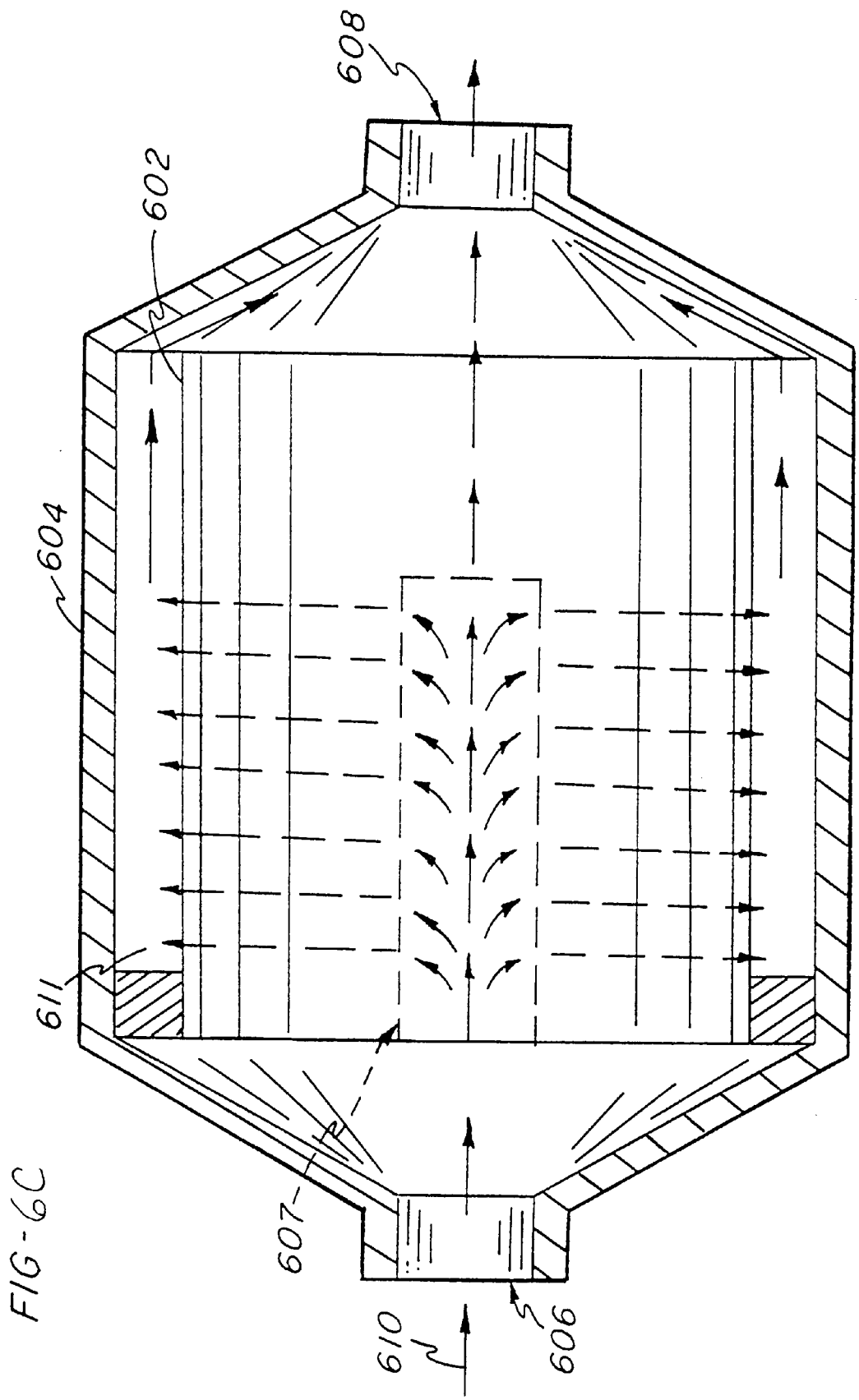
FIG. 6C is a cross-sectional view of one configuration of a catalytic converter having the catalytic core element of FIG. 6A.

One such configuration is shown in FIG. 6C whereby the catalytic core element 602 of FIG. 6A is positioned within, and spaced from, a housing 604 to form an annulus 611 therebetween. As illustrated by arrows 610, representing the flow of exhaust gases, exhaust gases are directed from the exhaust inlet 606 through the longitudinally extending aperture 607, radially outwardly from the aperture 607 through the catalytic core element 602 to the annulus 611, and out through the exhaust outlet 608. In another configuration, as shown in FIG. 6D, the catalytic core element 602 of FIG. 6B is positioned within a housing 604. Exhaust gases, as illustrated by arrows 610, are directed into said catalytic core element 602 through apertures 609a, radially outwardly from the apertures 609a through the catalytic core element 602 to apertures 609b, and out of the catalytic core element 602.

While the foregoing describes particular catalytic core element configurations, it should be apparent to one skilled in the art that other catalytic core element configurations may be utilized. By directing the exhaust flow radially through the catalytic core element the effective thickness or length of the catalytic core element is reduced thereby controlling or reducing the flow resistance or pressure loss. Further, depending on the desired configuration of the catalytic core element and the particular application, the catalytic housing may be appropriately configured. For example, the housing may be configured with an outer flow channel to permit treated exhaust flow passing radially outwardly through the catalytic core element to exit axially out through an outlet port to be discharged into the atmosphere.

Catalytic converters for use in automobiles and small appliances and equipment often encounter severe space limitations. Since the catalytic core element according to the subject invention is not susceptible to fracture, the catalytic converter assembly itself may be made simpler in structure. Further, since the particular dimensions and shape of the catalytic core element may be varied to accommodate the desired purposes and may be produced without difficulty by the production process according to the present invention, the catalytic converter housing may be eliminated by directing positioning the catalytic core element within the exhaust manifold or exhaust pipe or tail pipe of the internal combustion engine. Referring to FIG. 7, a cross-sectional view of an exhaust manifold 700 of a typical internal combustion engine is shown having a right exhaust manifold section 704, a left exhaust manifold section 706, a crossover pipe 708, and an outlet connection 710 connected to the exhaust pipe 712. The catalytic core element 702 is shown configured to be coaxially disposed within the exhaust manifold 700. Thus, the catalytic converter of the subject invention eliminates the space requirement necessary for conventional catalytic converters and may be manufactured with significantly less time and cost than conventional catalytic converters requiring an outer housing. Further, by positioning the catalytic core element in the exhaust manifold the permits the rapid activation of the catalytic catalyst without the need of a secondary heating system.

Figure 8:
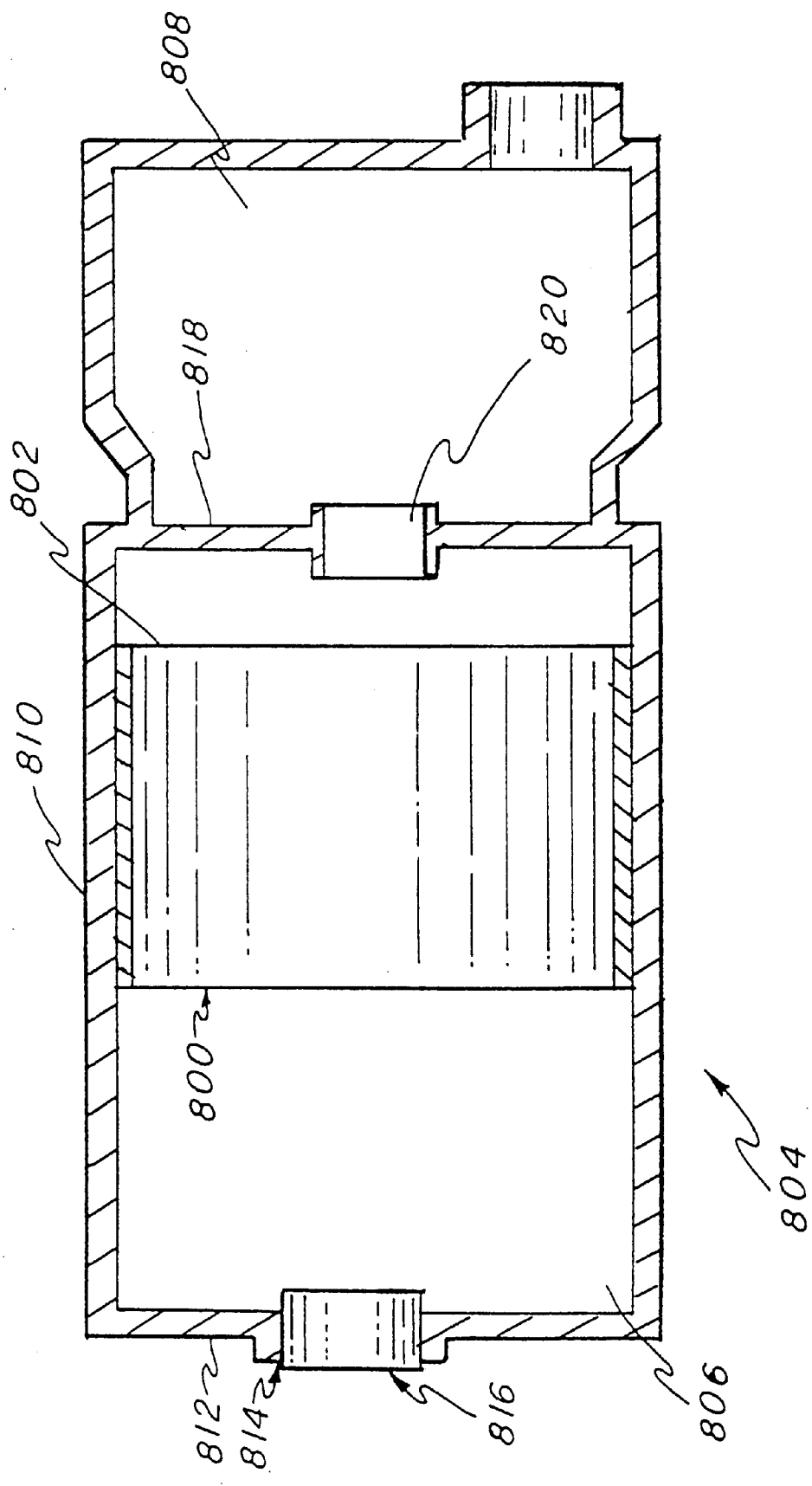
FIG. 8 is a cross-sectional longitudinal view of another embodiment of the catalytic converter of the present invention installed in a catalytic converter and muffler assembly having a catalytic converter region and a acoustical or attenuation region.

Referring to FIG. 8, another embodiment of the catalytic converter 800 of the present invention is shown whereby the catalytic converter is placed within a catalytic converter and muffler assembly 804 having a catalytic converter region 806 and a downstream acoustical or attenuation region 808. With respect to operation as an exhaust noise muffler, the principals of operation are found in known muffler constructions and are well known in the noise attenuation industry. The catalytic converter 800 of the subject invention is positioned within the catalytic converter region 806 of the catalytic converter and muffler assembly 804 and includes a catalytic core element 802 enclosed within a housing 810 having an outer end wall 812 having an inlet port 814 for receiving one end of an exhaust pipe 816 and an inner end wall 818 that also forms an end wall of the adjacent attenuation region 808 and includes an outlet port 820. In operation, exhaust gases are delivered from the engine by the exhaust pipe 816 to the catalytic converter and muffler assembly 804. The exhaust gases pass through the catalytic core element 802 and are directed through outlet port 820 into the acoustical or attenuation region 808 where the transmission of sound in the exhaust gas is conventionally reduced.

There has thus been provided a novel catalytic converter having a catalytic core comprising at least one catalytic core element formed of a rigid, porous body or substrate of foam-like, high temperature, metallic material which is capable of withstanding the thermal stresses and vibrations encountered in typical catalytic converter installations and applications. Catalytic converters utilizing such foam-like, high temperature, metallic materials are relatively easy and inexpensive to manufacture, have relatively long operating life, and require the same or less space than conventional catalytic converters. It should be apparent to one skilled in the art that catalytic core elements formed from such rigid, foam-like, high temperature, metallic materials may be configured to be easily incorporated into the exhaust manifold or exhaust pipe of an internal combustion engine or incorporated into a muffler assembly thereby reducing the overall size of an exhaust system. Further, the use of foam-like, high temperature, metallic material selected from the group consisting of platinum, palladium, rhodium and a combination thereof, eliminates or greatly reduces the need for catalytic coatings thereby simplifying and decreasing time and expense of manufacture. Further, the catalytic core element(s) may be electrically heated to substantially activate the catalytic action.

Although this invention has been shown and described with respect to detailed embodiments thereof, it will be understood by those skilled in the art that various changes in form and detail thereof may be made without departing from the spirit and scope of the claimed invention.

What is claimed is:

1. A catalytic converter for insertion in an exhaust manifold of an internal combustion engine comprising a catalytic core element comprising at least one rigid metallic segment having interconnecting metallic walls which define an open pattern of micronically sized interconnected pores which join together to form irregular passages extending through said metallic segment, said metallic segment having a configuration for placement within the exhaust manifold and wherein said metallic material is formed from an alloy comprising aluminum, chromium and iron.

2. The catalytic converter of claim 1 wherein said alloy further comprises at least one member selected from the group consisting of cobalt, columbium, molybdenum, nickel, gold, siler, platinum, palladium, rhodium, rare earths titanium, tantalum, and tungsten.

3. The catalytic converter of claim 1 wherein said alloy further comprising rare earths.

4. A catalytic converter for use with the exhaust system of an internal combustion engine, the catalytic converter comprising:

a catalytic core element comprising at least one segment comprising a rigid metallic material having interconnecting walls defining an open pattern of interconnected pores which join together to from irregular passages extending through said segment;

wherein said segment is formed from an alloy comprising aluminum, chromium, and iron and wherein said catalytic core element having a configuration for placement within the exhaust system.

5. The catalytic converter of claim 4 wherein said alloy further comprises at least one member selected from the group consisting of cobalt, columbium molybdenum, nickel, gold silver, platinum, palladium, rhodium, rare earths, titanium tantalum, and tungsten.

6. The catalytic converter of claim 4 wherein said alloy further comprising rare earths.

* * * * *